United States Patent

[11] 3,597,708

[72] Inventor Henry W. Perreault
Chelmsford, Mass.
[21] Appl. No. 889,393
[22] Filed Dec. 31, 1969
[45] Patented Aug. 3, 1971
[73] Assignee Raytheon Company
Lexington, Mass.

[54] BROADBAND RADIO FREQUENCY TRANSMISSION LINE TERMINATION
12 Claims, 10 Drawing Figs.

[52] U.S. Cl. .......... 333/22 R, 333/22 F, 333/81 A
[51] Int. Cl. .......... H01p 1/24
[50] Field of Search .......... 333/22, 81, 82

[56] References Cited

UNITED STATES PATENTS

| | | | |
|---|---|---|---|
| 2,475,344 | 7/1949 | Wheeler | 333/81 X |
| 3,202,943 | 8/1965 | Milliquet | 333/82 X |
| 3,300,737 | 1/1967 | Stevens et al. | 333/22 |
| 3,452,293 | 6/1969 | De Long et al. | 333/82 X |
| 3,509,496 | 4/1970 | Griffin et al. | 333/22 |

*Primary Examiner*—Eli Lieberman
*Assistant Examiner*—Marvin Nussbaum
*Attorneys*—Harold A. Murphy, Joseph D. Pannone and Edgar O. Rost

ABSTRACT: An electromagnetic energy termination device is provided with power absorbing means in a structure having plural reentrant electrical paths in series defined by concentric coaxial conductors within a substantially reduced mechanical configuration. Movement of a fluid dielectric medium within a fluidtight chamber is provided either in parallel or serially along the electrical paths to absorb high average and peak powers at ultrahigh radio frequencies over relatively wide bandwidths.

INVENTOR
HENRY W. PERREAULT
BY [signature]
ATTORNEY

INVENTOR
HENRY W. PERREAULT
BY [signature]
ATTORNEY

PATENTED AUG 3 1971

3,597,708

INVENTOR
HENRY W. PERREAULT

BY Edgar O. Rost

ATTORNEY

BROADBAND RADIO FREQUENCY TRANSMISSION LINE TERMINATION

The invention herein described was made in the course of or under a contract or subcontract thereunder with Department of the Army.

BACKGROUND OF THE INVENTION

1. Field of the Invention

The disclosed structure relates to termination devices of the matched-impedance load type for absorbing high-power radio frequency electromagnetic energy.

2. Description of the Prior Art

In transmission systems for the propagation of electromagnetic energy, particularly at ultrahigh radio frequencies, the problem of termination of transmission lines for detection and measurement purposes at high average and peak pulse power levels presents a continuing need for advancement in the art. Impedance-matching, bandwidth and energy-absorption characteristics are the critical parameters to be considered in providing substantially reflectionless energy-absorption characteristics under varied environmental conditions. A fluid of interest utilized as the dielectric medium in a calorimetric energy dissipative load is water and such devices may be generically referred to as water loads. In the frequency range envisaged in the present application the loss characteristics of the dielectric medium, particularly in long pulse applications requires devices of exceedingly long electrical lengths to obtain the desired impedance matches as well as power-handling capability. An exemplary embodiment of the prior art configuration is disclosed in U.S. Pat. No. 3,044,027, issued July 10, 1962 to D. D. Chin et al. and entitled "Radio Frequency Load."

For higher power applications, particularly at low-frequency bands in the S and L-band range, numerous solutions have also evolved involving dry termination loads. Such loads, however, become objectionably cumbersome and expensive and create problems with the materials employed, particularly at the high temperatures generated.

Ideally, energy-absorbing loads must be capable of absorbing output power levels which can run as high as tens to hundreds of kilowatts average and thousands to megawatts peak over the bandwidths of interest. Further, the impedance matching of the termination to the transmission line must be reasonably independent of temperature as well as be relatively insensitive to surrounding environmental conditions. The voltage standing wave ratio ratings (VSWR) of the termination devices must also fall in the range of between 1.01 and 1.5 to be acceptable in transmission systems, particularly for use in radar applications. A need arises, therefore, for improved termination devices having high average and peak power handling capabilities with low VSWR ratings over substantially broad frequency bands in a substantially reduced overall mechanical configuration providing performance characteristics comparable with or greater than prior art devices.

SUMMARY OF THE INVENTION

In accordance with the teachings of the present invention a broadband transmission line termination is provided with either a fluid or solid lossy dielectric absorbing medium. The device is capable of absorbing high-energy power levels, particularly at ultrahigh radio frequencies, comparable to and higher than prior art devices by reason of a unique disclosed mechanical structure. A plurality of concentrically disposed coaxial reentrant transmission paths are electrically connected in series to provide an overall electrical distance of a substantial number of wavelengths which would be electrically equivalent to a device of the straight in-line type having an overall length of from two to three times greater. The transmission paths are alternately shorted at their ends to present a lossy serpentine path to the electromagnetic energy coupled to the device by appropriate means. In fluid utilization devices for increased energy absorption characteristics the distribution of such fluids may be either parallel or in series within the electrical paths disposed in a hollow fluidtight energy-permeable chamber.

In appearance the termination device resembles a folded or telescoping unit and is equally adaptable to coaxial or rectangular waveguide transmission line systems. Impedance-matching techniques such as a tapered entrance wall of fluidtight energy-permeable means facilitates uniform dissipation of the energy impinging on the termination by the lossy absorbing medium and minimizes reflections of energy.

An exemplary embodiment of the invention is described having a peak power-handling capability of 2 megawatts and average power capability of 25 kilowatts over a frequency range of approximately 1,000 MHz. A coaxial line termination configuration is disclosed along with several embodiments incorporating the concentric coaxial reentrant concept in rectangular waveguide. The VSWR characteristics measured with the improved device were well within the required range. The overall mechanical length of the disclosed termination devices has been reduced measurably in comparison to prior art power-handling devices and, by suitable modifications, power levels of even greater magnitude now may be absorbed.

BRIEF DESCRIPTION OF THE DRAWINGS

The invention, as well as the details for the provision of preferred embodiments, will be readily understood after consideration of the following detailed description and reference to the accompanying drawings, wherein.

DESCRIPTION OF THE PREFERRED EMBODIMENTS

Figure 1:
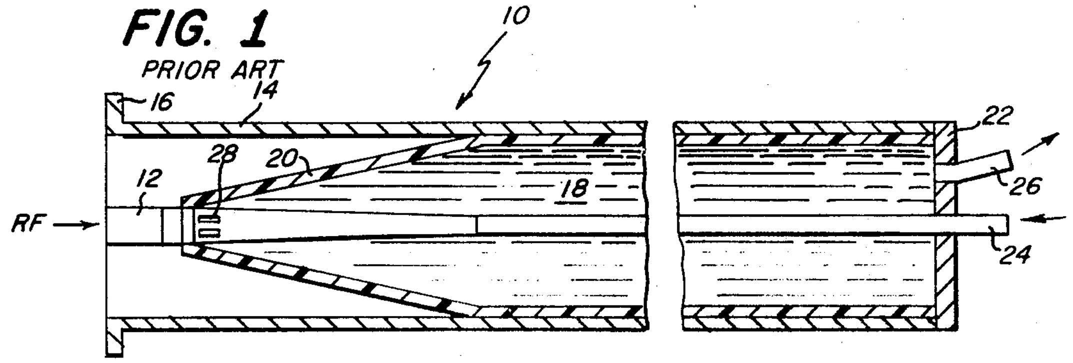
FIG. 1 PRIOR ART
FIG. 1 is a cross-sectional view of a prior art embodiment of devices in the field of interest.

Referring to the drawings, FIG. 1 is exemplary of prior art in-line energy absorbers of the waterload type for terminating coaxial transmission lines. The associated main transmission line system is coupled by suitable means such as a spring contact member to the center conductor 12 concentrically disposed within outer conductor 14 of the device 10. Mating flange 16 provides for coupling the respective transmission lines. To provide a fluidtight chamber 18 a hollow tapered dielectric member 20 encircles center conductor 12 and is enclosed at the wide end-by-end plate member 22 joined to the outer conductor 14. The tapered wall portion -inch 20 is selected to provide an impedance match between the absorbing medium and transmission line. The member 20 may be fabricated of any suitable energy permeable material such as quartz glass or plastic materials. Some excellent choices are readily available under the trade names "Vicor," "Rexolite" or "Lucite."

The dielectric fluid medium is introduced into the absorbing device by means of inlet connector 24 and outlet connector 26 disposed in end plate member 22. Openings 28 in center conductor 12 adjacent to the radio frequency input end of the absorbing device 10 provides for maximum flow of the fluid in the area where most of the radio frequency is absorbed. Such devices for use in high-power low radio frequency systems, illustratively around 100—500 MHz., have lengths in a range of from 10 to 12 feet in 3⅛-inch coaxial transmission line. The required length imposes a weight and space problem and tapered impedance-matching structures also can become exceedingly difficult to fabricate due to the required lengthy taper.

Figure 2:
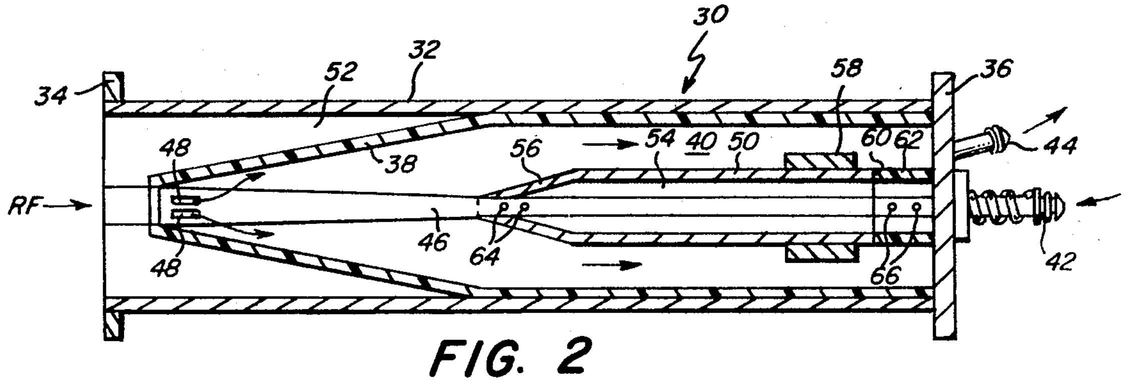
FIG. 2 is a cross-sectional view of an illustrative embodiment of the invention referred to as a two-pass device.

In marked contrast with the prior art embodiments, reference is now directed to FIG. 2 wherein an illustrative embodiment 30 of the present invention is disclosed for substantially the same or even higher peak and average power levels over a wide frequency range including out-of-band matching up to second harmonics with an overall length approximately one-third to one-half of the prior art devices. The outer conductor 32 supports a mating flange 34 at one end and is enclosed at the other end by end plate member 36 to define with a tapered dielectric member 38 a fluidtight chamber 40. Inlet and outlet connectors 42 and 44, respectively, extend within end plate member 36 for circulation of a dielectric medium through center conductor 46 which extends axially within device 30 as well as a plurality of radial openings 48 disposed adjacent the radio frequency input end. Up to this point all structure is basically similar to the prior art device with the exception of the fact that the overall length, by reason of the invention, will be substantially reduced.

In accordance with my teachings a concentric conductor 50 is disposed coaxially with the outer conductor 32 and defines with center conductor 46 a coaxial reentrant termination line. Electrical energy impinging on the input end traverses a first path 52 and then is provided with a second or reentrant path 54 within conductor 50 terminating at the tapered wall 56 where the conductor 50 is joined and supported by center conductor 46. The proper electrical parameters are met by appropriate tapering not only of the dielectric member 38 but tapering forward wall 56 of conductor 50 as well, and a matching transformer 58 secured to conductor 50 adjacent to a coupling gap 60. In view of the desirability of providing a dielectric medium within the paths 52 and 54 the coupling gap 60 is filled with an energy permeable sleeve member 62 which is impervious to fluid such as the material available under the trade name "Teflon." It will be noted that the lossy serpentine electrical energy paths 52 and 54 are in series and the circulation of the dielectric medium is similarly oriented. A fluid introduced through connector 42 flows through hollow conductor 46 and the openings 48 adjacent the front end of the device. The flow then passes through the coaxial reentrant path 54 by means of apertures 64 and 66 at the forward and rear ends of this section. Fluid egress from the device is attained through outlet 44.

Illustratively, the coaxial reentrant conductor 50 together with the main transmission path forms an electrical path of several wavelengths in length for utilization in the termination of energy at the low-frequency end of the UHF band. Where the previous termination devices required a length of approximately 10—12 feet the invention can provide an electrically equivalent absorbing path in a device having an overall length of approximately 6 feet with a 3 foot coaxial reentrant section at a considerable saving in cost and weight. In addition to illustrating the series distribution of the dielectric medium the disclosed embodiment shown in this view is illustrative of the type of device which will be referred as the two-pass termination load.

Figure 3:
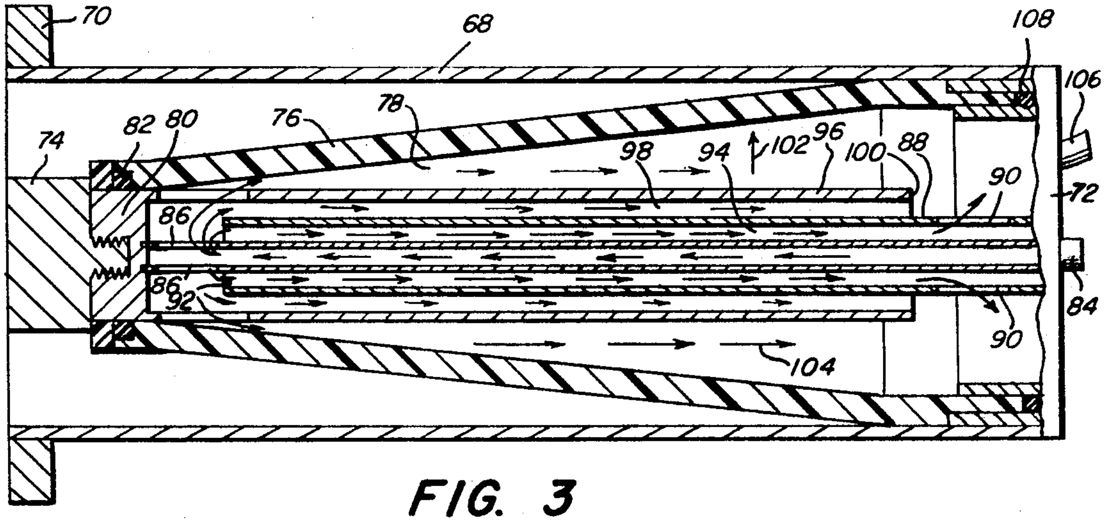
FIG. 3 is a cross-sectional view of an alternative embodiment of the invention incorporating parallel flow of a dielectric medium.

Referring next to FIG. 3 an exemplary embodiment of a three-pass device as well as parallel distribution of the dielectric medium will now be described. Again as in the previous embodiment outer conductor 68 is provided with flange 70, end plate 72, center conductor 74 and hollow tapered dielectric member 76 defining chamber 78. In this device the apex end of the dielectric member is provided with a plug member 80 and O-ring seal 82 to distribute the fluid medium in a parallel manner. Plural conductive members are disposed in a coaxial reentrant arrangement within the chamber 78 by means of plug member 80 as well as end plate 72. A reentrant electrical path is thereby defined alternately shorted electrically to provide an overall transmission path of a substantial number of wavelengths in a compact configuration.

A first or central conductor member 84 provides the inlet for the dielectric fluid medium and has passages 86 adjacent the plug member 80. Concentrically disposed about this conductor is a second conductor 88 having passages 90 for the flow of the fluid medium and an open end 92 adjacent plug member 80. The outer walls of conductor 84 define with conductor 88 a coaxial transmission path 94. A third conductor 96 is supported by plug member 80 which also provides the shorting end wall in the reentrant electrical series arrangement. A third transmission path 98 is thereby defined by the conductors 96 and 88 with entrance afforded by the open end 100.

The path of the electrical energy coupled through a main associated transmission line then traverses the main path as indicated by the vertical arrow 102 and is coupled to coaxial reentrant path 98 through open end 100. The next traversal is in a reverse manner through open end 92 of conductor 88 along path 94 until the alternate short-circuiting wall defined by end plate member 72 is contacted.

The flow of the liquid medium is indicated by the arrows 104 parallel to the plural conductors commencing with the input at the outer end of the conductor 84. From the passages 86 it will be observed that the flow will now be parallel throughout all the electrical transmission paths and the fluid is ejected through outlet 106. To assure the fluidtight feature of the overall embodiment the hollow tapered dielectric member 76 is sealed to end plate member 72 by means of an O-ring arrangement 108.

Figure 4:
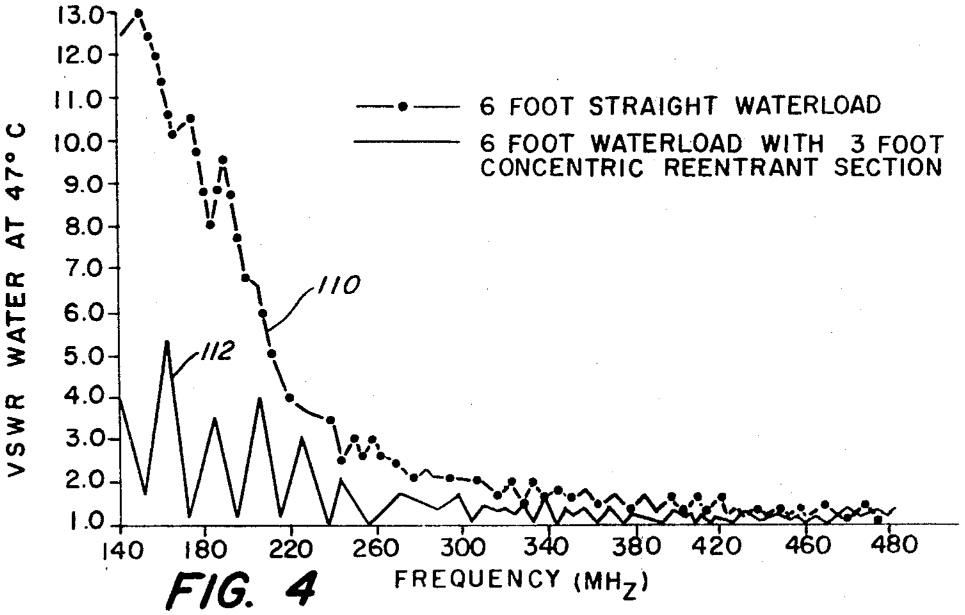
FIG. 4 is a graph comparing the VSWR characteristics of the illustrative embodiment of the present invention and a prior art device over a similar frequency range.

FIG. 4 represents a comparison graph of the standing wave ratio response of a coaxial termination load with a dielectric medium (water at 47° C.) of the same overall length as the embodiment of the invention without a coaxial reentrant section and the embodiment of the invention with such a section. The bandwidth measured is substantially 350 MHz. Broken line 110 indicates how unsatisfactory the load of the same overall length would be in the range of interest particularly at the low-frequency end between 140 and 300 MHz. The embodiment of the invention with the reentrant line section shown by solid line 112 indicates a marked improvement in the electrical parameters. In the foregoing measurements the dielectric medium was circulated throughout the electrical paths.

Figure 5:
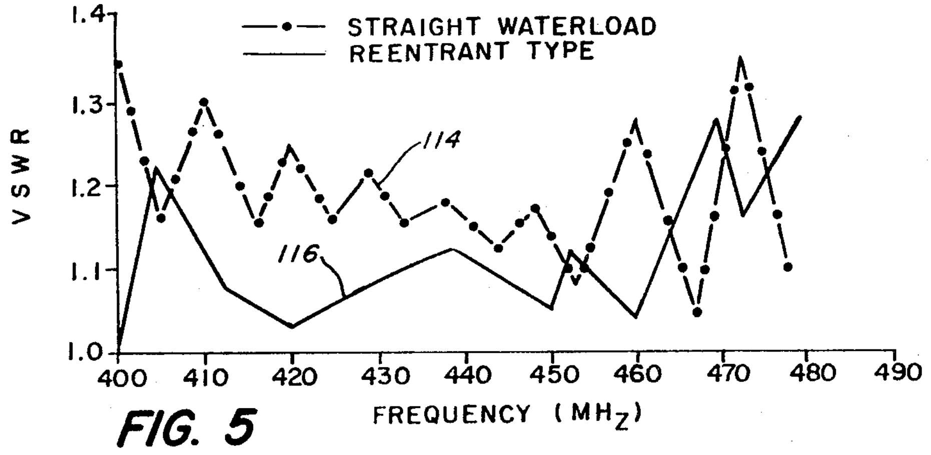
FIG. 5 is a graph of VSWR vs frequency over a relatively narrow frequency range.

Turning next to FIG. 5, a similar comparison graph is shown with relation to the foregoing devices over a more selected and specific bandwidth of 90 MHz. The prior art embodiment without a reentrant line section is indicated by the broken line 114 while the embodiment of the invention is depicted by solid line 116. This electrical measurement which may be referred to as the inband response again indicates that lower voltage standing wave ratios may be attained with the embodiment of the invention.

Figure 6:
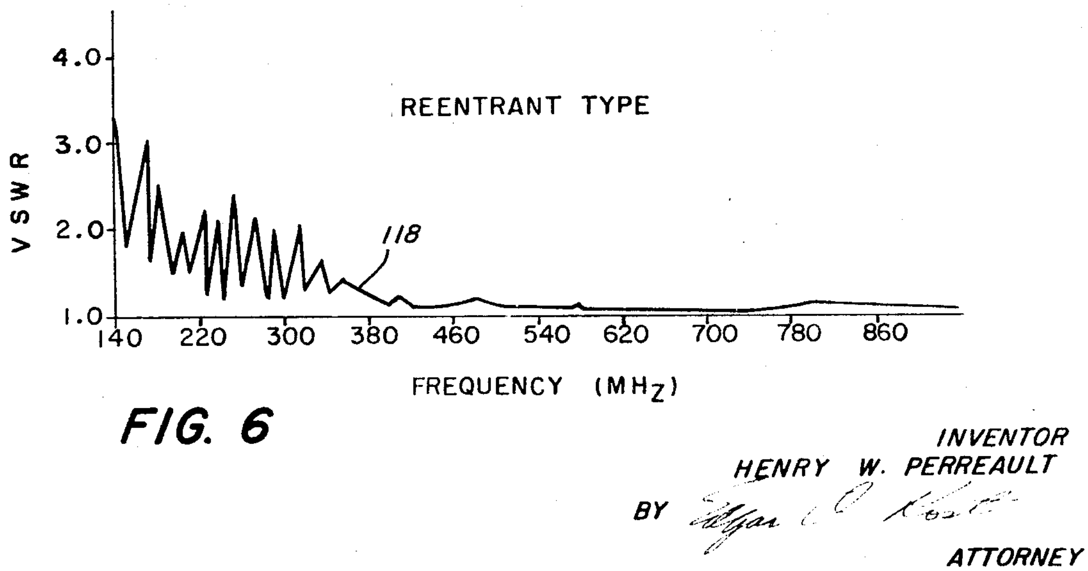
FIG. 6 is a graph of the response of the illustrative embodiment of the invention over a relatively large frequency band.

In FIG. 6 the standing wave ratio response is shown over a wider band range utilizing the embodiment of the invention as indicated by the solid line 118. This graph indicates the broadband characteristics of the embodiment of the invention with a voltage standing wave ratio of approximately 1.2 to 1 throughout most of the band. Of particular interest is this measurement is the fact that out-of-band matching is possible from lower frequencies up to the second harmonics.

Figure 7:
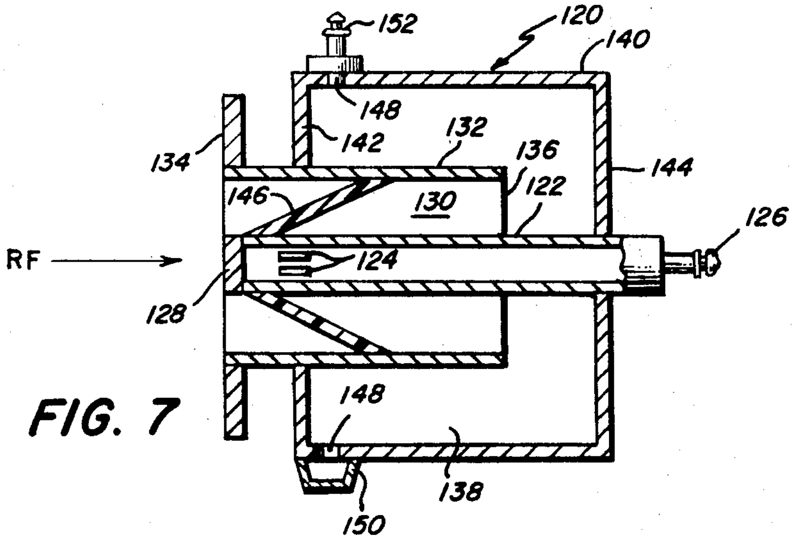
FIG. 7 is a cross-sectional view of an alternative embodiment of the invention.

In FIG. 7 an alternative embodiment of the invention is disclosed which will be referred to as the inside-outside coaxial reentrant configuration. In this embodiment the main transmission line is coupled to a first transmission path located centrally concentrically within means defining a communicating second transmission path. The embodiment 120 may also, as in the previous examples, be in the coaxial or rectangular waveguide configuration. A center conductor 122 is provided with fluid passages 124 for the distribution of a fluid introduced into the device through inlet conductor 126. The associated main transmission line is coupled through plug member 128 on the inner end of the center conductor 122. The first transmission path 130 is defined with a second conductor member 132 supporting at one end a mating flange 134 for coupling to the main transmission line. The energy traverses the first main path 130 and is coupled by gap 136 at the end of conductor 132 into a second transmission path 138. This path is defined by the surrounding second conductor 140 joined at one end to conductor 132 by means of wall 142 which serves as a short circuit termination end wall. Wall 144 joined to the center conductor 122 forms the alternate short circuit end for line 130. The energy traversing the first transmission path 130 is suitably matched electrically to the main line by means of a tapered dielectric member 146 supported between the walls of conductors 122 and 132. The fluid introduced through the connector 126 is circulated throughout the fluidtight paths 130 and 138 and is emitted through apertures 148 into a manifold 150 to outlet connector 152. The foregoing embodiment has been described as a two-pass arrangement and additional coaxial reentrant conductors may be provided in those applications requiring a larger number of electrical wavelengths for the termination of the high-power energy.

Figure 8:
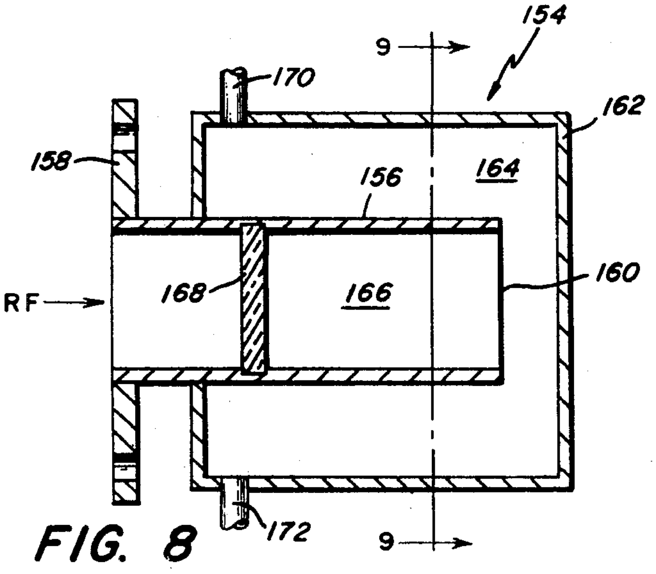
FIGS. 8 and 9 are cross-sectional views of a rectangular waveguide embodiment of the invention.
Figure 9:
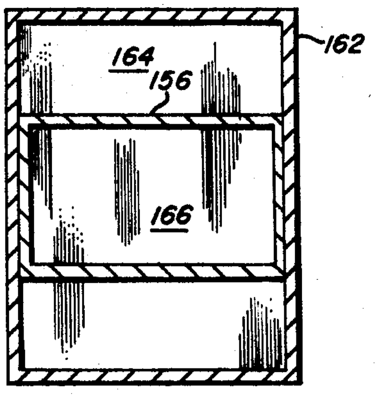

In FIGS. 8 and 9 a novel alternative embodiment involving rectangular waveguide transmission lines is disclosed. The termination device 154 provides a rectangular inner conductor section 156 having a mating flange 158 adjacent one end for coupling to the main transmission line and an open coupling end 160. Encircling the conductor 156 is an outer conductor 162 enclosing and defining a second transmission path 164 coupled to the first transmission path 166. In fluid medium applications, a fluidtight chamber may be provided by means of a dielectric block or window member 168 sealed within conductor 156. The circulating fluid is introduced into the device by means of inlet and outlet connectors 170 and 172.

Figure 10:
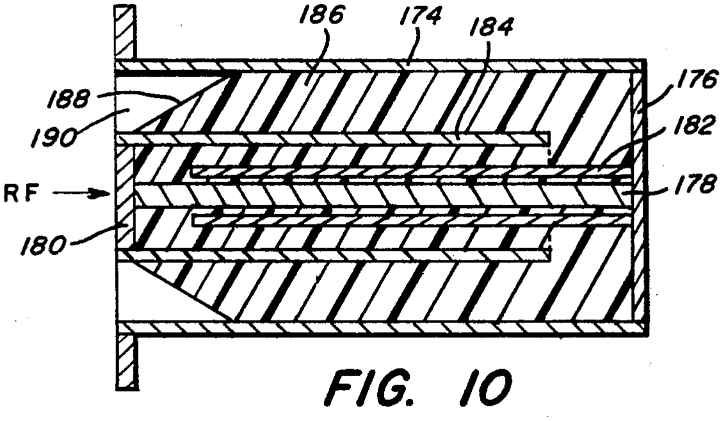
FIG. 10 is another alternative embodiment of the invention incorporating a solid dielectric medium.

FIG. 10 illustrates in a three-pass device the provision of a solid dielectric medium for the absorption of the electrical energy. The folded serpentine coaxial reentrant line concept disclosed in this embodiment follows along the lines of the invention disclosed and described in FIG. 3. An outer conductor 174 is closed at one end by short-circuiting end wall 176. An inner coaxial conductor 178 is supported between end wall 176 and a plug member 180 adjacent the high incident power end of the device. A second concentric coaxial conductor 182 is supported at one end by end wall 176. The third concentric coaxial reentrant conductor 184 is supported by member 180 to thereby provide for the alternate short-circuiting end wall arrangement for the provision of an overall electrical transmission path of a substantial number of electrical wavelengths. The entire cross-sectional area of the device is filled with the solid dielectric medium 186 of a lossy plastic material and a tapered entrance wall 188 may be provided in the main transmission path 190.

There is thus disclosed an efficient high-power matched-impedance transmission line termination for absorbing high-power electrical energy with a device having a substantially reduced mechanical configuration by means of the coaxial reentrant folded line concept of the invention.

I claim:

1. A radio frequency transmission line termination device comprising:
- means defining a transmission line section adapted for mating with a main transmission line system;
- at least one concentrically disposed conductive member defining within said section a plurality of alternately short-circuited coaxial reentrant electrical paths having a total overall distance electrically equivalent to a device of a substantially longer overall length;
- means defining a fluidtight chamber within said section;
- and means for circulating an electromagnetic energy absorbing medium along said electrical paths.

2. A radio frequency transmission line termination device according to claim 1 wherein said fluidtight chamber is defined by a hollow dielectric member.

3. A radio frequency transmission line termination device according to claim 1 wherein said fluidtight chamber is defined by an energy-permeable member disposed within said transmission line section.

4. A radio frequency transmission line termination device according to claim 1 wherein said fluidtight chamber is defined by a hollow tapered dielectric member.

5. A radio frequency transmission line termination device according to claim 1 wherein said transmission line system is of a coaxial waveguide configuration and said fluidtight chamber is defined by an annular dielectric member.

6. A radio frequency transmission line termination device according to claim 1 wherein movement of said energy-absorbing medium is in series relative to said electrical paths.

7. A radio frequency transmission line termination device according to claim 1 wherein movement of said energy-absorbing medium is parallel relative to said electric paths.

8. A radio frequency transmission line termination device comprising:
- means defining a transmission line section adapted for mating with a main transmission line system having a predetermined operating frequency;
- concentrically disposed conductors defining within said section an arrangement of a first transmission path and at least one additional coaxial reentrant path all electrically in series to provide a total distance electrically equivalent to a greater number of wavelengths of said operating frequency relative to a device having approximately the same overall length;
- and an electromagnetic energy absorbing medium substantially filling all said paths.

9. A radio frequency transmission line termination device according to claim 8 wherein said first transmission path is centrally disposed with respect to the additional reentrant paths.

10. A radio frequency transmission line termination device according to claim 8 wherein said first transmission path comprises the outermost member of the arrangement of concentrically disposed electrical paths.

11. A radio frequency transmission line termination device according to claim 8 and means for matching the electrical impedance of said main transmission line system to said transmission line section conductors.

12. A radio frequency transmission line termination device according to claim 8 and means for matching the electrical impedance of said main transmission line system to the impedance characteristics of said energy-absorbing medium.